United States Patent
Okawara

(10) Patent No.: US 10,603,959 B2
(45) Date of Patent: Mar. 31, 2020

(54) PNEUMATIC TIRE

(71) Applicant: Sumitomo Rubber Industries, Ltd., Kobe-shi, Hyogo (JP)

(72) Inventor: Renya Okawara, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 614 days.

(21) Appl. No.: 15/287,816

(22) Filed: Oct. 7, 2016

(65) Prior Publication Data

US 2017/0120687 A1 May 4, 2017

(30) Foreign Application Priority Data

Oct. 20, 2015 (JP) ................. 2015-212466

(51) Int. Cl.
| | |
|---|---|
| B60C 11/11 | (2006.01) |
| B60C 11/13 | (2006.01) |
| B60C 11/01 | (2006.01) |
| B60C 11/03 | (2006.01) |
| B60C 11/12 | (2006.01) |

(52) U.S. Cl.
CPC ............ B60C 11/11 (2013.01); B60C 11/01 (2013.01); B60C 11/0302 (2013.01); B60C 11/0304 (2013.01); B60C 11/1315 (2013.01); B60C 11/1392 (2013.01); B60C 11/1236 (2013.01); B60C 2011/133 (2013.01); B60C 2200/14 (2013.01)

(58) Field of Classification Search
CPC . B60C 11/1315; B60C 11/1392; B60C 11/11; B60C 11/0304; B60C 11/0302; B60C 11/01; B60C 11/1236; B60C 2011/133; B60C 2200/14
See application file for complete search history.

(56) References Cited

U.S. PATENT DOCUMENTS

2013/0139936 A1* 6/2013 Ohara ................ B60C 13/02
  152/209.11
2015/0290977 A1* 10/2015 Yamamoto ........... B60C 11/12
  152/209.18

FOREIGN PATENT DOCUMENTS

JP      5-038904 A    2/1993

* cited by examiner

*Primary Examiner* — Steven D Maki
*Assistant Examiner* — Philip N Schwartz
(74) *Attorney, Agent, or Firm* — Birch, Stewart, Kolasch & Birch, LLP

(57) ABSTRACT

A pneumatic tire includes a tread portion provided with central blocks on both sides of a tire equator. Each of the central blocks includes a ground contact surface with an axially outer block edge and an outer block sidewall extending radially inwardly from the outer block edge. Each outer block edge includes a first inclined edge and a second inclined edge in an opposite inclination direction to the first inclined edge. The first inclined edge has an average angle of from 75 to 85 degrees and the second inclined edge has an average angle of from 30 to 50 degrees, with respect to the axial direction of the tire. Each outer block sidewall includes a middle portion and a pair of end portions, wherein the middle portion is inclined gently with respect to the end portions in relation to a radial direction of the tire.

11 Claims, 6 Drawing Sheets

PNEUMATIC TIRE

BACKGROUND ART

Field of the Invention

The present invention relates to pneumatic tires, and in particular relates to a pneumatic tire having excellent mud and dirt performance.

Description of the Related Art

Pneumatic tires (e.g., tires for four-wheel-drive vehicles) tend to travel not only on soft rough terrain such as sand, mud and the like, but also on hard dried mud terrain. In order to improve mud performance of tires as ability that grabs mud and soil to generate sufficient traction while preventing tread grooves from being clogged, it has been known to increase groove volume of the tread.

Unfortunately, the above mentioned pneumatic tire having a tread with higher volume groove ratio may bring low tread rigidity which does not generate much traction on hard rough terrain.

SUMMARY OF THE INVENTION

In view of the above problems in the conventional art, the present invention has an object to provide a pneumatic tire having excellent mud and dirt performance.

In one aspect of the invention, a pneumatic tire includes a tread portion provided with a plurality of circumferentially arranged central blocks on both sides of a tire equator. Each of the central blocks includes a ground contact surface with an axially outer block edge facing a tread edge on each side of the tire equator and an outer block sidewall extending radially inwardly from the outer block edge. Each outer block edge includes a first vertex located on the side of the tire equator, a first inclined edge extending axially outwardly from the first vertex and a second inclined edge extending axially outwardly from the first vertex in an opposite inclination direction to the first inclined edge. The first inclined edge has an average angle in a range of from 75 to 85 degrees with respect to an axial direction of the tire, and the second inclined edge has an average angle in a range of from 30 to 50 degrees with respect to the axial direction of the tire. Each outer block sidewall includes a middle portion including the first vertex and a part of the first and second inclined edges, and a pair of end portions located on circumferentially both sides of the middle portion, wherein the middle portion is inclined gently with respect to the end portions in relation to a radial direction of the tire.

In another aspect of the invention, a circumferential length of the first inclined edge may be smaller than a circumferential length of the second inclined edge.

In another aspect of the invention, the ground contact surface of each central block may include an axially inner block edge facing the tire equator. The inner block edge may include a second vertex located on the side of the tire equator, a third inclined edge extending axially outwardly from the second vertex in the same inclination direction as the first inclined edge and a fourth inclined edge extending axially outwardly from the second vertex in the same inclination direction as the second inclined edge. The fourth inclined edge may include a first portion and a second portion having a smaller angle with respect to the axial direction of the tire than that of the first portion.

In another aspect of the invention, the first portion may be located axially outward of the second portion.

In another aspect of the invention, a circumferential length of the third inclined edge may be smaller than a circumferential length of the fourth inclined edge.

In another aspect of the invention, the tread portion may further be provided with a plurality of circumferentially arranged shoulder blocks that are arranged axially outward of the central blocks on at least one side of the tire equator. Each of the shoulder blocks may include a ground contact surface having a third vertex located on the side of the tire equator, a fifth inclined edge extending axially outwardly from the third vertex, a sixth inclined edge extending axially outwardly from the third vertex in an opposite inclination direction to the fifth inclined edge and a seventh inclined edge extending axially outwardly from an axially outer end of the sixth inclined edge in the same inclination direction as the fifth inclined edge, wherein the fifth inclined edge may have an angle of from 35 to 45 degrees with respect to the axial direction of the tire, the sixth inclined edge may have an angle of from 55 to 65 degrees with respect to the axial direction of the tire and the seventh inclined edge may have an angle of from 35 to 45 degrees with respect to the axial direction of the tire.

In another aspect of the invention, in a pair of adjacent shoulder blocks, a circumferential length between adjacent the seventh inclined edge and the fifth inclined edge may be in a range of from 40% to 60% of a circumferential pitch of the pair of adjacent shoulder blocks.

In another aspect of the invention, in a pair of adjacent shoulder blocks, a circumferential length between adjacent the seventh inclined edge and the fifth inclined edge may decrease toward the tread edge.

In another aspect of the invention, circumferential pitches of the shoulder blocks may be substantially same as circumferential pitches of the central blocks.

In another aspect of the invention, the respective shoulder blocks may be arranged in different circumferential positions with respect to the respective central blocks, in a distance of from 30% to 50% of the circumferential pitches of the shoulder blocks.

DESCRIPTION OF THE PREFERRED EMBODIMENTS

Figure 1:
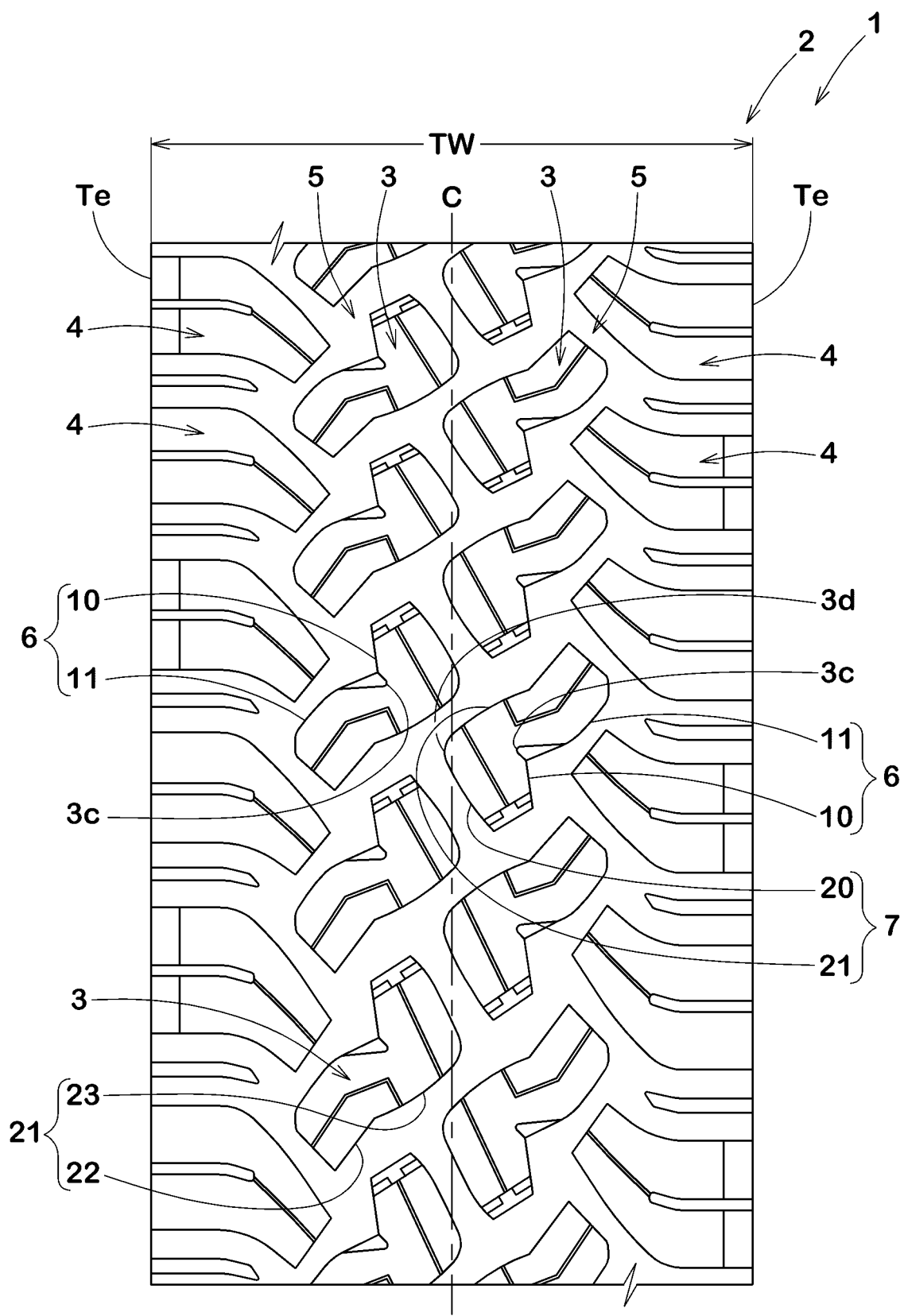
FIG. 1 is a development view of a tread portion of a pneumatic tire according to an embodiment of the present invention.

An embodiment of the present invention will be explained below with reference to the accompanying drawings. FIG. 1 illustrates a development view of a tread portion 2 of a pneumatic tire 1 according to an embodiment of the present invention. In this embodiment, the pneumatic tire 1, for example, is embodies as an all season tire for four-wheel-drive vehicle.

As illustrated in FIG. 1, the tread portion 2 is provided with a plurality of central blocks 3, a plurality of shoulder blocks 4 and grooves 5.

A plurality of central blocks 3 is arranged in the circumferential direction of the tire on both sides of the tire equator C. A plurality of shoulder blocks 4 is arranged in the circumferential direction of the tire on both sides of the tire equator C on the side of each tread edge Te. The grooves 5 are arranged around the central blocks 3 and/or the shoulder blocks 4. In this embodiment, the central blocks 3 and the shoulder blocks 4 are substantially arranged in point symmetry around an arbitrary center on the tire equator C except variable pitches of the respective blocks. Note that the block arrangement of the tread is not particularly limited to the above aspect.

As used herein, the tread edges Te refer to axially outermost edges of the ground contacting patch of the tread portion 2 which occurs under a normally inflated loaded condition when the camber angle of the tire is zero. The normally inflated loaded condition is such that the tire 1 is mounted on a standard wheel rim with a standard pressure, and is loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

In this application including specification and claims, various dimensions, positions and the like of the tire refer to those under a normally inflated unloaded condition of the tire unless otherwise noted. The normally inflated unloaded condition is such that the tire 1 is mounted on the standard wheel rim with the standard pressure but is loaded with no tire load. The tread width TW is the width measured under the normally inflated unloaded condition, as the axial distance between the tread edges Te and Te.

Preferably, the central blocks 3 and the shoulder blocks 4 may have radial heights of from 12 to 18 mm.

Figure 2:
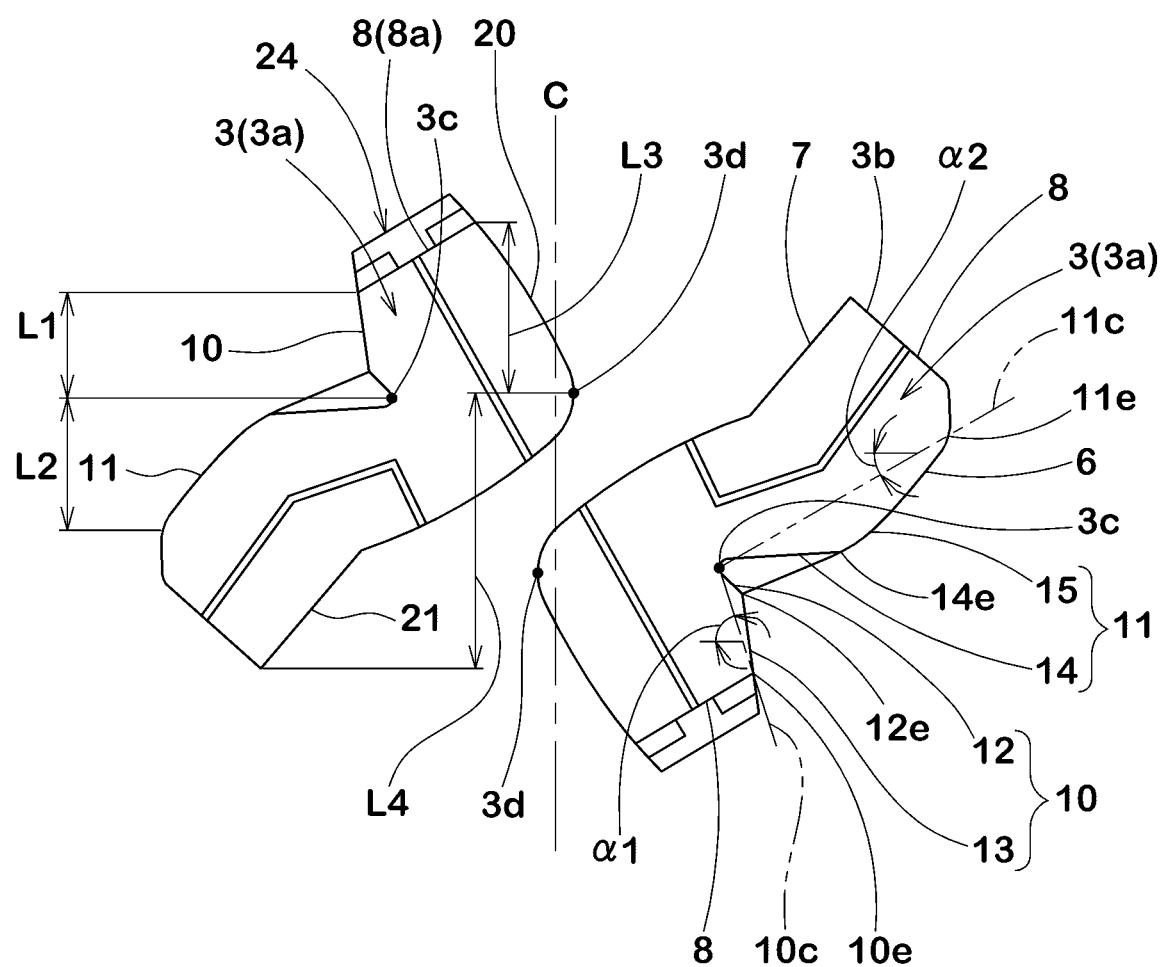
FIG. 2 is an enlarged view of a pair of central blocks of FIG. 1.

FIG. 2 illustrates an enlarged view of a pair of central blocks 3 and 3 which are adjacent in the axial direction of the tire. As illustrated in FIG. 2, each central block 3 includes a ground contact surface 3a that includes an outer block edge 6 facing the tread edges Te, an inner block edge 7 facing the tire equator C and a pair of end edges 8 and 8 that connect the outer block edge 6 and the inner block edge 7. In each central block 3, the outer block edge 6, the inner block edge 7 and end edges 8 are a periphery edge of the ground contact surface 3a where the ground contact surface 3a and a block sidewall 3b cross each other.

The outer block edge 6 includes a first vertex 3c which is an axially innermost point of the outer block edge 6, a first inclined edge 10 extending axially outwardly from the first vertex 3c and a second inclined edge 11 extending axially outwardly from the first vertex 3c in an opposite inclination direction to the first inclined edge 10. Such an outer block edge 6 may improve mud performance by grabbing mud and soil effectively.

The first inclined edge 10 and the second inclined edge 11 respectively extend from the first vertex 3c to the axially outer ends 10e and 11e in an opposite direction from each other with respect to the axial direction of the tire.

The first inclined edge 10 includes a primary portion 12 extending from the first vertex 3c and a secondary portion 13 extending from the outer end 12e of the primary portion 12 and having a greater angle with respect to the axial direction of the tire than that of the primary portion 12. The second inclined edge 11 includes a thirdly portion 14 extending from the first vertex 3c and a fourthly portion 15 extending from the outer end 14e of the thirdly portion 14 and having a greater angle with respect to the axial direction of the tire than that of the thirdly portion 14. That is, in the central blocks 3, the primary portion 12 and the thirdly portion 14 which are located on the side of the tire equator C have relatively smaller angles than those of the secondary portion 13 and the fourthly portion 15, respectively. Thus, the central blocks 3 can grab mud and soil effectively using a recessed space between the primary portion 12 and the thirdly portion 14 to improve mud performance. Furthermore, the secondary portion 13 and the fourthly portion 15 having relatively greater angles with respect to the axial direction of the tire can help to release mud smoothly from the recessed space so as to clean the space.

The first inclined edge 10 has an average angle $\alpha 1$ of from 75 to 85 degrees with respect to the axial direction of the tire. The second inclined edge 11 has an average angle $\alpha 2$ of from 30 to 50 degrees with respect to the axial direction of the tire. Since the first inclined edge 10 has different angle to the second inclined edge 11, imbalance deformation occurs to the inclined edges 10 and 11 when grounding so as to release mud from the recessed space. Note that the average angles $\alpha 1$ and $\alpha 2$ of the inclined edges 10 and 11 are angles of straight lines 10c and 11c that respectively extend from the first vertex 3c to the outer ends 10e and 11e, as illustrated using phantom lines in FIG. 2.

When the angle $\alpha 1$ of the first inclined edge 10 is less than 75 degrees or the angle $\alpha 2$ of the second inclined edge 11 is less than 30 degrees, the angle between the first inclined edge 10 and the second inclined edge 11 is excessively small, and thus it may be difficult to get better traction on mud terrain. When the angle $\alpha 1$ of the first inclined edge 10 is more than 85 degrees or the angle $\alpha 2$ of the second inclined edge 11 is more than 50 degrees, the angle between the first inclined edge 10 and the second inclined edge 11 is excessively large, and thus it may also be difficult to get better traction on mud terrain.

In this embodiment, the first inclined edge 10 preferably has the circumferential length L1 smaller than the circumferential length L2 of the second inclined edge 11. In other words, the length L2 of the second inclined edge 11 with a relatively small angle with respect to the axial direction is greater than the length L1 of the first inclined edge 10 with a relatively large angle with respect to the axial direction. Accordingly, the second inclined edge 11 can effectively increase mud traction.

Figure 3:
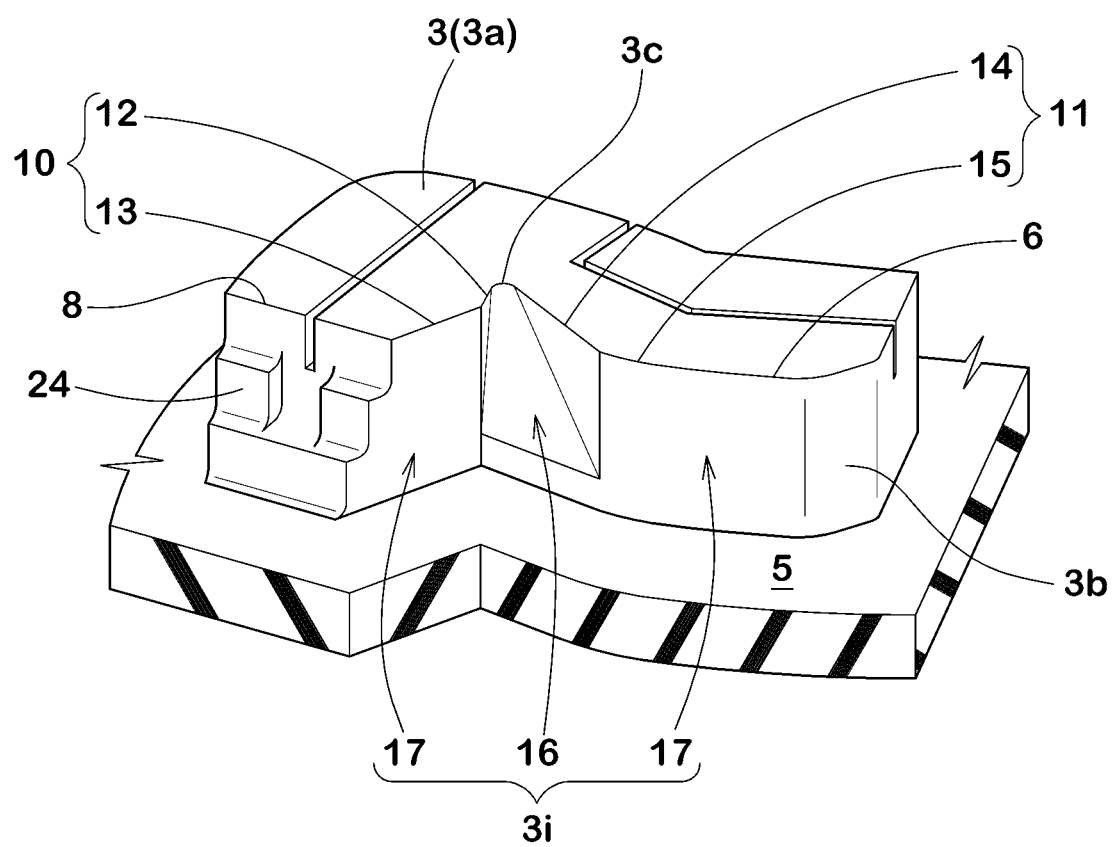
FIG. 3 is a perspective view of one of central blocks.

As illustrated in FIG. 3, each of the central blocks 3 includes an outer block sidewall 3i extending radially inwardly from the outer block edge 6. The outer block sidewall 3i includes a middle portion 16 and a pair of end portions 17 and 17 located on circumferentially both sides of the middle portion 16. The middle portion 16 is defined as a portion that includes a part of the first inclined edge 10 and a part of the second inclined edge 11 so as to include the first vertex 3c.

Furthermore, the middle portion 16 is inclined gently with respect to the respective end portions 17 in relation to the radial direction of the tire. Thus, the rigidity of the central block 3 near the middle portion 16 can be enhanced relatively, thereby increasing traction on dirt terrain. On the other hand, the rigidity of the central block 3 near the end portions 17 can be lowered relatively so that the end portions 17 deform easily when grounding to grab mud in them sufficiently, thereby improving mud traction.

As described above, the tread portion 2 of the tire 1 in accordance with the present embodiment can grab mud sufficiently and then release it smoothly so as to clean the grooves 5 by itself using deformation of the central blocks 3 with the improved outer block edges 6 when grounding. In addition, the middle portions 16 of the outer block sidewalls 3i with gentle inclination angles may improve rigidity of portions of the central blocks 3 around the first vertexes 3c to improve dirt traction. Therefore, the tire 1 in accordance with the present embodiment can exhibit excellent mud and dirt performance.

In each central block 3 of this embodiment, the middle portion 16 is configured as a block wall including the primary portion 12 and the thirdly portion 14. On the other hand, block sidewalls extending radially inwardly from the secondary portion 13 and the fourthly portion 15 are configured to form the end portions 17.

Figure 4:
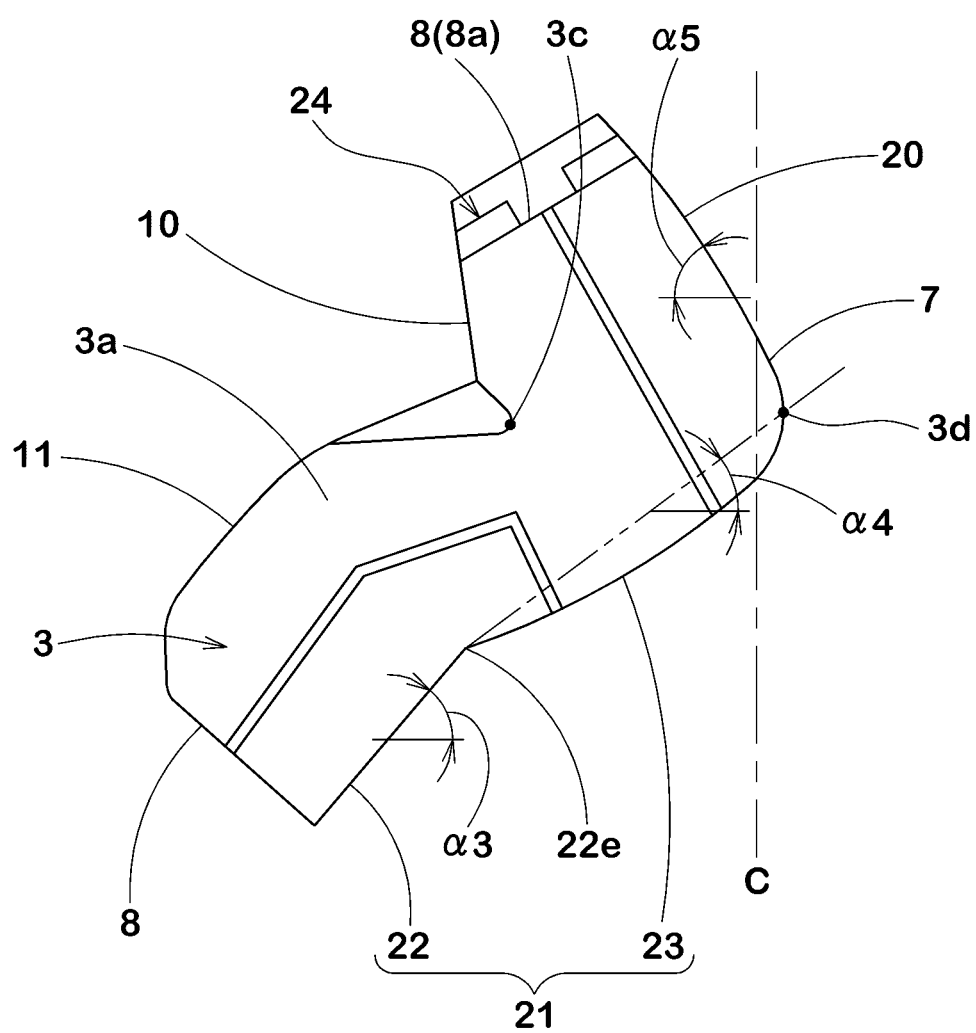
FIG. 4 is an enlarged view of one of central blocks illustrated in FIG. 2.

As illustrated in FIG. 4, each inner block edge 7 includes a second vertex 3d which is an axially innermost point of the inner block edge 7, a third inclined edge 20 extending from the second vertex 3d with the same inclination direction as the first inclined edge 10 and a fourth inclined edge 21 extending from the second vertex 3d with the same inclination direction as the second inclined edge 11. Since the third inclined edge 20 as well as the fourth inclined edge 21 include axial components of the tire, they may help to increase mud traction.

In this embodiment, the ground contact surfaces of the central blocks 3 are configured as a substantially V-shaped manner protruding axially inwardly in a plan view. Thus, such a central block 3 can grab mud between the first inclined edge 10 and the second inclined edge 11 and then release it toward the tread edge Te to clean the groove by itself.

The third inclined edge 20 is configured as an arc manner which is convex to the tire equator C. The third inclined edge 20 may help to increase the ground contact surface 3a of the central blocks 3 so that rigidity of a portion of the central blocks 3 on the side of the tire equator C, which receives large ground contact pressure, can be improved to increase traction on hard terrain.

Note that the third inclined edge 20 is preferably inclined at an angle α5 of from 55 to 65 degrees with respect to the axial direction of the tire.

The fourth inclined edge 21 includes a first portion 22 extending in a straight manner and a second portion 23 extending from an end 22e of the first portion 22 toward the tire equator C. Such a second portion 23 also increase better traction on hard terrain.

Preferably, the angle α4 of the second portion 23 with respect to the axial direction is smaller than the angle α3 of the first portion 22 with respect to the axial direction in order to balance mud performance with dirt performance. Note that the angle α4 of the second portion 23 is defined as an angle of a straight line that extends between the second vertex 3d and the end 22e of the first portion 22.

In this embodiment, the first portion 22 is provided on the side of the tread edge Te with respect to the second portion 23. That is, the first portion 22 with a larger angle α3 is located on the side of the tread edge Te with respect to the second portion 23 with a smaller angle α4. Thus, an axially outer portion of the central blocks 3 may deform easily when grounding to release mud smoothly therearound.

In order to further improve the advantageous effects, the angle α3 of the first portion 22 is preferably in a range of from 55 to 65 degrees with respect to the axial direction of the tire, and the angle α4 of the second portion 23 is preferably in a range of from 20 to 30 degrees with respect to the axial direction of the tire.

In this embodiment, a corner portion between the third inclined edge 20 and the fourth inclined edge 21 is configured as an arc manner that is convex toward outside the central blocks 3 to improve rigidity of each central block 3. Since the central blocks 3 in accordance with the present embodiment may have relatively high rigidity in the circumferential middle region, excellent dirt performance can be obtained.

As illustrated in FIG. 2, the circumferential length L3 of the third inclined edge 20 is preferably smaller than the circumferential length L4 of the fourth inclined edge 21. Namely, since the circumferential length L4 of the fourth inclined edge 21, which has a relatively small angle α4 with respect to the axial direction of the tire, is greater, a portion around the fourth inclined edge 21 can facilitate to deform by receiving ground contact pressure upon straight traveling, thereby improving self cleaning feature of the tread portion 2.

In this embodiment, one or more central blocks 3 include a step-like sidewall 24 that extends radially inwardly in a step-like manner from an end edge 8a. Thus, the step-like sidewall 24 can produce a crack on mud clogged in grooves 5 adjacent the end edge 8a so that the mud can be broken and then released easily from the grooves. Furthermore, since the step-like sidewall 24 is connected to the end edge 8a inclined with respect to the axial direction of the tire, it further improve the above advantageous effect.

In this embodiment, the central blocks 3 extend from one side to the other side with respect to the tire equator C so that a pair of axially adjacent central blocks 3 and 3 overlap each other in the axial direction of the tire to improve a central tread pattern rigidity.

Figure 5:
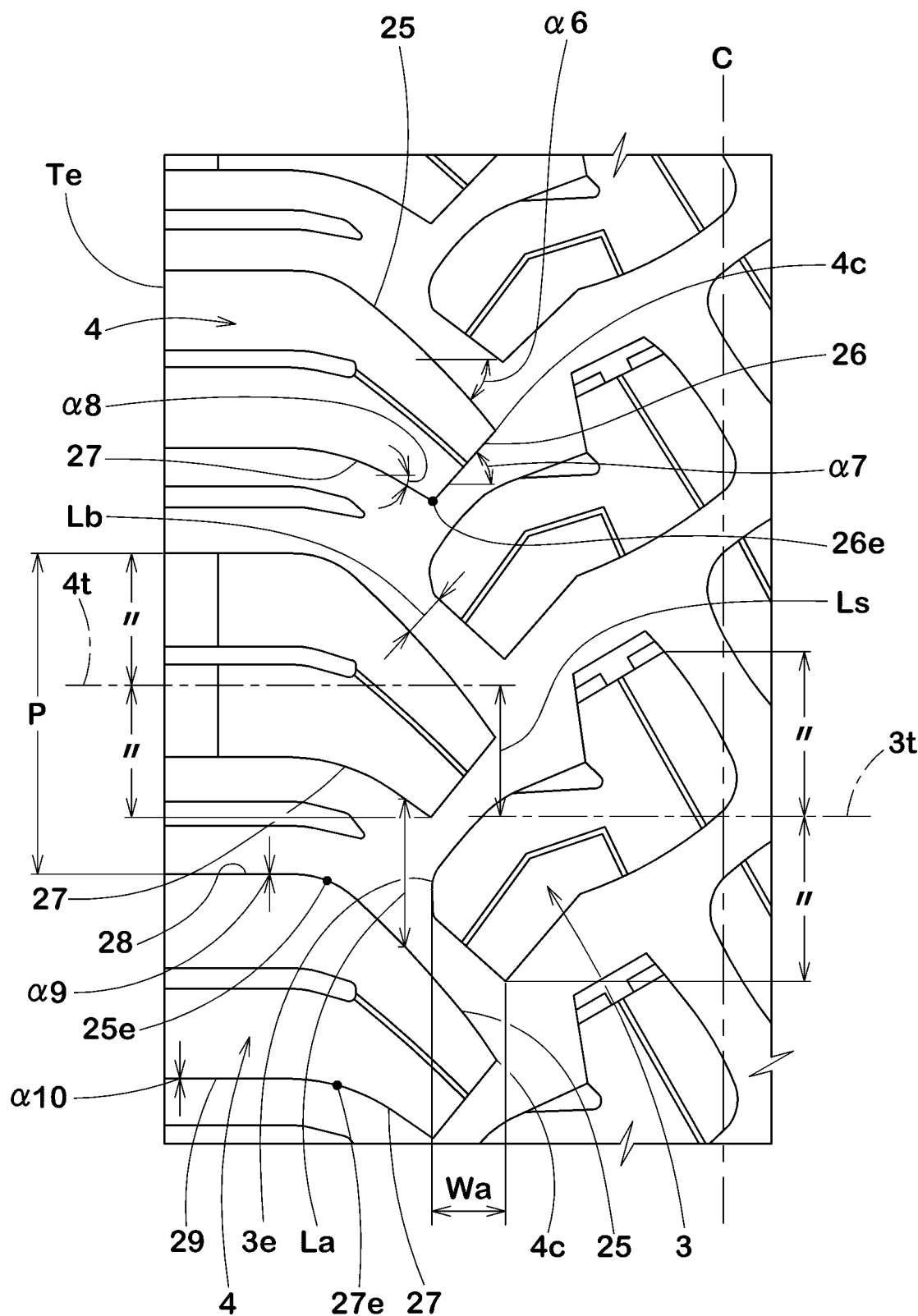
FIG. 5 is an enlarged view of a left side half portion of the tread portion of FIG. 1.

As illustrated in FIG. 5, each of the shoulder blocks 4 includes a ground contact surface surrounded by a third vertex 4c, a fifth inclined edge 25, a sixth inclined edge 26 and a seventh inclined edge 27. The fifth inclined edge 25 extends axially outwardly with an inclination from the third vertex 4c that protrudes toward the tire equator C. The sixth inclined edge 26 extends axially outwardly from the third vertex 4c with an opposite inclination to the fifth inclined edge 25. The seventh inclined edge 27 extends axially outwardly from the axially outer end 26e of the sixth inclined edge 26 with an inclination same as the fifth inclined edge 25. Such a shoulder block having the fifth to seventh edges 25 to 27 may also help to increase mud traction since it has axial edge components.

Preferably, the fifth inclined edge 25 is inclined at an angle α6 of from 35 to 45 degrees with respect to the axial direction of the tire. Preferably, the seventh inclined edge 27 is also inclined at an angle α8 of from 35 to 45 degrees with respect to the axial direction of the tire. This may be useful to uniform the circumferential rigidity of the shoulder blocks 4 over the axial direction so that the shoulder blocks 4 generate large traction.

Preferably, the sixth inclined edge 26 is inclined at an angle α7 of from 55 to 65 degrees with respect to the axial direction of the tire. This may be useful to maintain sufficient rigidity of an axially inner portion of each shoulder block 4 so as to improve dirt performance of the tire.

The shoulder blocks 4 also includes eighth inclined edges 28 extending axially outwardly from axially outer ends 25e of the fifth inclined edges 25 to the tread edge Te and ninth inclined edges 29 extending axially outwardly from the axially outer ends 27e of the seventh inclined edge 27 to the tread edge Te. The eighth inclined edges 28 extend in angles α9 with respect to the axial direction of the tire that are smaller than the angles α6 of the fifth inclined edges 25. The ninth inclined edges 29 extend in angles α10 with respect to the axial direction of the tire that are smaller than the angles α8 of the seventh inclined edges 27. These eighth inclined edges 28 and the ninth inclined edges 29 may enhance the rigidity of axially outer both portions of the tread portion 2, which are apt to receive large lateral force when cornering, to further improve dirt performance as well as mud performance of the tire.

In view of further improving the above advantageous effect, the average angles α9 of the eighth inclined edges 28 are preferably in a range of not more than 10 degrees with respect to the axial direction of the tire. In the same point of view, the average angles α10 of the ninth inclined edge 29 are preferably in a range of not more than 10 degrees with respect to the axial direction of the tire.

In a pair of adjacent shoulder blocks 4 and 4, a circumferential length La between adjacent the seventh inclined edge 27 and the fifth inclined edge 25 is in a range of from 40% to 60% of a circumferential pitch P of the pair of adjacent shoulder blocks 4. When the length La is less than 40% the pitch P, it may be difficult to discharge mud from a void between the first inclined edge 10 and the second inclined edge 11 through the tread edge Te. When the length La is more than 60% the pitch P, circumferential rigidity of the shoulder blocks 4 may be deteriorated. Note that the circumferential length La is measured at a location where the fifth inclined edge 25 does not overlap with the central blocks 3 in the axial direction of the tire, Furthermore, in a pair of adjacent shoulder blocks 4 and 4, the circumferential length La preferably decreases toward the tread edge Te. Thus, the rigidity of the shoulder blocks 4 on the side of the tread edge Te can be enhanced to further improve dirt performance.

Preferably, circumferential pitches of the shoulder blocks 4 are substantially same as circumferential pitches of the central blocks 3. This configuration may improve dirt performance of the tire since the axial rigidity of the tread portion 2 can be uniformed.

Preferably, the respective shoulder blocks 4 are arranged in different circumferential positions with respect to the respective central blocks 3, in a distance Ls of from 30% to 50% of the circumferential pitches P of the shoulder blocks 4. This configuration may improve dirt performance of the tire in good balance since the axial rigidity of the tread portion 2 can be uniformed over the circumferential direction of the tire. Note that the distance Ls is a circumferential distance between the middle position 4t of each maximal circumferential length of the shoulder block 4 and the middle position 3t of each maximal circumferential length of the central block 3.

In this embodiment, each third vertex 4c of the shoulder blocks 4 is located axially inward of each axially outer end 3e of the central blocks 3 so that the shoulder blocks 4 and the central blocks 3 are overlapped with each other in the axial direction of the tire. Thus, rigidity of the tread portion 2 can further be enhanced, thereby improving dirt performance of the tire.

Preferably, overlapping lengths Wa between the shoulder blocks 4 and the central blocks 3 are in a range of from 4% to 9% the tread width TW in order to improve dirt performance while maintaining mud performance as well as self cleaning feature of the grooves.

Preferably, the minimal distance Lb between one shoulder block 4 and one central block 3 is in a range of from 1% to 5% the tread width TW in order to further improve self cleaning feature to release mud from the grooves smoothly while maintaining tread pattern rigidity.

While the particularly preferable embodiments in accordance with the present invention have been described in detail, the present invention is not limited to the illustrated embodiments, but can be modified and carried out in various aspects.

EXAMPLE

Test tires for four-wheel-drive vehicle with a basic tread pattern illustrated in FIG. 1 were manufactured based on the detail shown in Table 1, and then mud and dirt performance of each tire was tested. Common specification and test method are as follows:

Tire size: 37×12.50R17

Tread width TW: 240 mm

Central block heights: 17.1 mm

Shoulder block heights: 17.1 mm

Rim: 9.0JJ

Internal pressure: 100 kPa

Mud and Dirt Performance Test:

Each test tire was mounted on a four-wheel-drive vehicle having a displacement of 3,600 cc as the all wheels, and then a driver drove the test vehicle on a tire test course with mud and dirt terrains to evaluate traction and self cleaning future of mud by his sense. The test results are shown in Table 1 with a score based on Ex. 1 being 7.0. The larger the value, the better the performance is.

Test results are provided in Table 1.

TABLE 1

Figure 6:
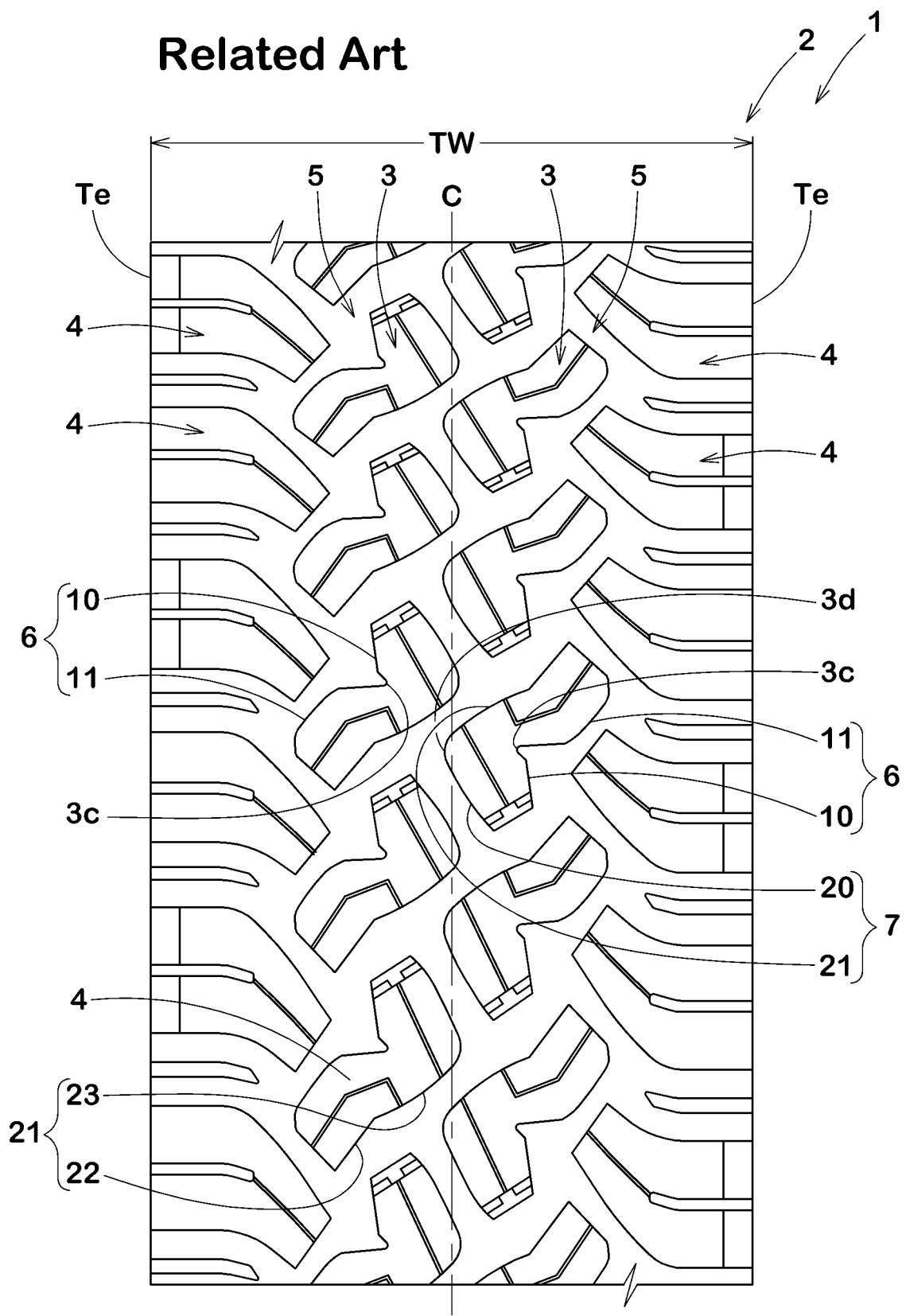
FIG. 6 is a development view of a tread portion in accordance with a comparative example.

|  | Ref. 1 | Ref. 2 | Ex. 1 | Ex. 2 | Ex. 3 | Ref. 3 | Ref. 4 | Ex. 4 | Ex. 5 |
| --- | --- | --- | --- | --- | --- | --- | --- | --- | --- |
| Tread pattern | FIG. 6 | FIG. 1 | FIG. 1 | FIG. 1 | FIG. 1 | FIG. 1 | FIG. 1 | FIG. 1 | FIG. 1 |
| First inclined edge angles α1 (deg.) | 80 | 70 | 80 | 75 | 85 | 90 | 80 | 80 | 80 |
| Second inclined edge angles α2 (deg.) | 40 | 40 | 40 | 40 | 40 | 40 | 25 | 30 | 50 |
| Ratio La/P (%) | 50 | 50 | 50 | 50 | 50 | 50 | 50 | 50 | 50 |
| Ratio Lb/TW (%) | 3 | 3 | 3 | 3 | 3 | 3 | 3 | 3 | 3 |

TABLE 1-continued

|  | | | | | | | | | |
|---|---|---|---|---|---|---|---|---|---|
| Mud performance (score) | 7.0 | 5.0 | 7.0 | 6.0 | 6.0 | 4.5 | 5.0 | 6.0 | 6.0 |
| Dirt performance (score) | 4.0 | 6.0 | 7.0 | 6.5 | 6.5 | 7.0 | 6.0 | 6.5 | 6.5 |

|  | Ref. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 |
| First inclined edge angles α1 (deg.) | 80 | 80 | 80 | 80 | 80 | 80 | 80 | 80 | 80 |
| Second inclined edge angles α2 (deg.) | 55 | 40 | 40 | 40 | 40 | 40 | 40 | 40 | 40 |
| Ratio La/P (%) | 50 | 35 | 40 | 60 | 65 | 50 | 50 | 50 | 50 |
| Ratio Lb/TW (%) | 3 | 3 | 3 | 3 | 3 | 0.5 | 1 | 5 | 7 |
| Mud performance (score) | 4.5 | 6.0 | 6.5 | 7.0 | 7.0 | 6.0 | 6.5 | 7.0 | 7.0 |
| Dirt performance (score) | 7.0 | 7.0 | 7.0 | 6.5 | 6.0 | 7.0 | 7.0 | 6.5 | 6.0 |

From the test results, it is confirmed that the example tires improve mud and dirt performance compared with the comparative example tires.

What is claimed is:

1. A pneumatic tire comprising:
a tread portion provided with a plurality of circumferentially arranged central blocks on both sides of a tire equator and a plurality of circumferentially arranged shoulder blocks arranged axially outward of the central blocks on at least one side of the tire equator;
each of the central blocks comprising a ground contact surface having an axially outer block edge facing a tread edge on each side of the tire equator and an outer block sidewall extending radially inwardly from the outer block edge;
each outer block edge comprising a first vertex located on the side of the tire equator, a first inclined edge extending axially outwardly from the first vertex, a second inclined edge extending axially outwardly from the first vertex in an opposite inclination direction to the first inclined edge, and an end edge extending axially inwardly from an axially outer end of the second inclined edge with an opposite inclination direction to the second inclined edge, wherein the first inclined edge has an average angle in a range of from 75 to 85 degrees with respect to an axial direction of the tire, and the second inclined edge has an average angle in a range of from 30 to 50 degrees with respect to the axial direction of the tire;
each outer block sidewall comprising a middle portion including the first vertex and a part of the first and second inclined edges, and a pair of end portions located on circumferentially both sides of the middle portion, wherein the middle portion is inclined gently with respect to the end portions in relation to a radial direction of the tire;
a respective one of the shoulder blocks comprising a ground contact surface comprising
a third vertex located on the side of the tire equator,
a fifth inclined edge extending axially outwardly from the third vertex in an opposite inclination direction with respect to the second inclined edges of the central blocks, the fifth inclined edge arranged so as to face a respective one of the end edges of the central blocks such that a minimum distance between the fifth inclined edge and the end edge of the respective one of the central blocks increases gradually toward the tire equator,
a sixth inclined edge extending axially outwardly from the third vertex in an opposite inclination direction to the fifth inclined edge, and
a seventh inclined edge extending axially outwardly from an axially outer end of the sixth inclined edge in a same inclination direction as the fifth inclined edge, wherein
the fifth inclined edge has an angle of from 35 to 45 degrees with respect to the axial direction of the tire,
the sixth inclined edge has an angle of from 55 to 65 degrees with respect to the axial direction of the tire, and
the seventh inclined edge has an angle of from 35 to 45 degrees with respect to the axial direction of the tire.

2. The pneumatic tire according to claim 1, wherein a circumferential length of the first inclined edge is smaller than a circumferential length of the second inclined edge.

3. The pneumatic tire according to claim 1, wherein
the ground contact surface of each central block comprises an axially inner block edge facing the tire equator,
the inner block edge comprises a second vertex located on the side of the tire equator, a third inclined edge extending axially outwardly from the second vertex in the same inclination direction as the first inclined edge and a fourth inclined edge extending axially outwardly from the second vertex in the same inclination direction as the second inclined edge, and
the fourth inclined edge comprises a first portion and a second portion having a smaller angle with respect to the axial direction of the tire than that of the first portion.

4. The pneumatic tire according to claim 3, wherein the first portion is located axially outward of the second portion.

5. The pneumatic tire according to claim 3, wherein a circumferential length of the third inclined edge is smaller than a circumferential length of the fourth inclined edge.

6. The pneumatic tire according to claim 1, wherein in a pair of adjacent shoulder blocks, a circumferential length between adjacent the seventh inclined edge and the fifth inclined edge is in a range of from 40% to 60% of a circumferential pitch of the pair of adjacent shoulder blocks.

7. The pneumatic tire according to claim 1, wherein in a pair of adjacent shoulder blocks, a circumferential length between adjacent the seventh inclined edge and the fifth inclined edge decreases toward the tread edge.

8. The pneumatic tire according to claim 1, wherein circumferential pitches of the shoulder blocks are substantially same as circumferential pitches of the central blocks.

9. The pneumatic tire according to claim 8, wherein the respective shoulder blocks are arranged in different circumferential positions with respect to the respective central blocks, in a distance of from 30% to 50% of the circumferential pitches of the shoulder blocks.

10. The pneumatic tire according to claim 1, wherein
each shoulder block further comprises an eighth inclined edge extending axially outwardly from an axially outer end of the fifth inclined edge to the tread edge and a ninth inclined edge extending axially outwardly from an axially outer end of the seventh inclined edge to the tread edge, an average angle of the eighth inclined edge is in a range of not more than 10 degrees with respect to the axial direction of the tire, and an average angle of the ninth inclined edge is in a range of not more than 10 degrees with respect to the axial direction of the tire.

11. The pneumatic tire according to claim 10, wherein the eighth inclined edge and the ninth inclined edge extend in parallel with the axial direction of the tire.

\* \* \* \* \*